(12) United States Patent
Chang et al.

(10) Patent No.: US 8,555,853 B2
(45) Date of Patent: Oct. 15, 2013

(54) INTERNAL COMBUSTION ENGINE PORT DESIGN LAYOUT FOR ENHANCED IN-CYLINDER SWIRL GENERATION

(75) Inventors: Shengming Chang, Troy, MI (US); Mark S. Huebler, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 757 days.

(21) Appl. No.: 12/719,050

(22) Filed: Mar. 8, 2010

(65) Prior Publication Data

US 2011/0214640 A1 Sep. 8, 2011

(51) Int. Cl.
*F02B 31/00* (2006.01)
*F02F 1/42* (2006.01)

(52) U.S. Cl.
USPC ..................... 123/306; 123/188.14

(58) Field of Classification Search
USPC ..................... 123/306, 307, 188.14
See application file for complete search history.

(56) References Cited

U.S. PATENT DOCUMENTS 5,429,086 A * 7/1995 Glackin ........................ 123/308

\* cited by examiner

*Primary Examiner* — Stephen K Cronin
*Assistant Examiner* — Sherman Manley

(57) ABSTRACT

An internal combustion engine includes a pair of adjacent cylinders, each one of the pair of adjacent cylinders includes a piston, a first intake valve, a second intake valve, a primary port associated with the first intake valve, and a secondary port associated with the second intake valve. Each of the ports is configured to provide a predominant direction of airflow therethrough during engine operation when viewed from above the cylinders and effectively oriented to provide respective in-cylinder air-swirl of opposite direction in each one of the pair of adjacent cylinders during an intake stroke of a respective piston.

17 Claims, 5 Drawing Sheets

INTERNAL COMBUSTION ENGINE PORT DESIGN LAYOUT FOR ENHANCED IN-CYLINDER SWIRL GENERATION

TECHNICAL FIELD

This disclosure is related to internal combustion engine cylinder air induction.

BACKGROUND

The statements in this section merely provide background information related to the present disclosure and may not constitute prior art.

During operation of an internal combustion engine, air and fuel are caused to be admitted into one or more cylinders present on the engine. Mixing of the air and fuel has implications on engine performance and exhaust emissions.

Known induction systems include natural aspiration, forced induction, carburetion, and fuel injection, with improvements generally being directed towards enhancing the qualities of the air/fuel mixtures admitted into such engines. The amount of swirling of air in a cylinder of a combustion engine during its intake strokes has an impact on the quality of the air/fuel mixture, with greater amounts of swirl being desirable at certain engine operating modes. However, known methods for creating increased amounts of in-cylinder air swirl have met with the drawback that increased swirl can only be had at the expense of some loss of airflow capacity in the induction system overall, resulting in an undesirable loss of engine volumetric efficiency.

SUMMARY

An internal combustion engine includes a pair of adjacent cylinders, each one of the pair of adjacent cylinders includes a piston, a first intake valve, a second intake valve, a primary port associated with the first intake valve, and a secondary port associated with the second intake valve. Each of the ports is configured to provide a predominant direction of airflow therethrough during engine operation when viewed from above the cylinders and effectively oriented to provide respective in-cylinder air-swirl of opposite direction in each one of the pair of adjacent cylinders during an intake stroke of a respective piston.

BRIEF DESCRIPTION OF THE DRAWINGS

One or more embodiments will now be described, by way of example, with reference to the accompanying drawings, in which.

DETAILED DESCRIPTION

Figure 1:
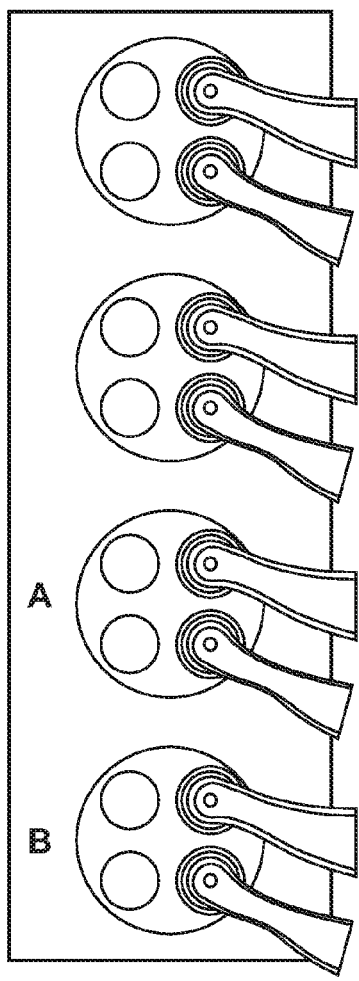
FIG. 1 is an overhead schematic view of related art intake ports and cylinders present on an in-line four-cylinder combustion engine, in accordance with the present disclosure.

Referring now to the drawings, wherein the showings are for the purpose of illustrating the disclosure only and not for the purpose of limiting the same, FIG. 1 shows an overhead schematic view of the relative dispositions of intake ports and cylinders present on related art in-line four-cylinder, four-cycle combustion engine. In FIG. 1, two of the shown adjacent cylinders are labeled A and B, for convenience. Adjacent cylinders have parallel cylinder axes. Overhead view or view from above as used herein are understood to mean a view along a cylindrical axis. In FIG. 1 the exhaust ports and their associated runners have been omitted, for clarity. Each of the intake ports of the cylinders in this two intake-valve per cylinder engine terminate at a conventional poppet valve disposed in the combustion chamber of the cylinder head, as is generally known in the art. The schematic representation shown in FIG. 1 can be of either a spark-ignition engine, or a compression-ignition (e.g. Diesel) engine.

One of the strokes of a four-cycle internal combustion engine is the intake stroke, during which a piston disposed in a bore travels downwards in that bore, with one or more of the poppet-style intake valves present on the engine's cylinder head being in an open position. By such action, air and/or an air-fuel mixture is drawn through intake ports cast into the cylinder head or otherwise provided, past the opened intake valve(s), into the cylinder, and subsequently compressed by the piston's upward movement in the same cylinder during a compression stroke. During the intake stroke, the piston sweeps out a volume which represents the theoretical maximum volume which can be filled with air and/or an air-fuel mixture. However, owing to a wide variety of factors and potential impedances present, including ambient air pressure, engine operating parameters, and restrictions or obstacles to flow present in the path of the incoming air, the theoretical limit of cylinder filling is rarely achieved. One impedance to airflow during an engine's intake stroke is the configuration of the intake ports. This includes the shape and orientation angle of the intake ports.

Figure 2:
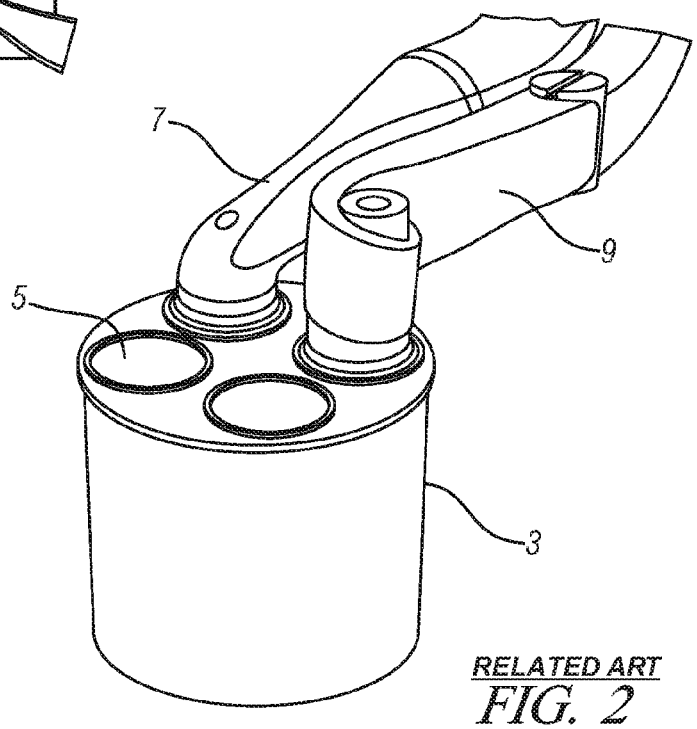
FIG. 2 is a perspective view of a related art cylinder having two intake ports, in accordance with the present disclosure.

One outcome of the nature of the intake stroke of the combustion engine in general is that during an intake stroke, the incoming air does not travel in a straight path, but is caused to form a vortex upon passing the intake valve and entering a cylinder. This vortex action is sometimes referred to as swirl, which has an impact on the combustion characteristics of air/fuel mixtures, and the gaseous emissions of combustion engines. Owing to constraints imposed by packaging, i.e., the limited space available on a typical engine cylinder head, achieving a beneficially increased amount of air swirl has been provided at the expense of reduced volumetric flow capability. This "swirl versus flow-capacity" tradeoff has historically caused design compromises which resulted in levels of engine performance below those theoretically attainable. An improved airflow delivery design is shown in FIG. 2 as a perspective representation of a cylinder 3 having a combustion chamber wall 5 that is provided with two intake valves, each having an associated port through which incoming air flows. FIG. 2 shows a two intake-valve per cylinder configuration, with a tangential port 7, and a helical port 9. The tangential port is so called, because the centerline of the main approach of air traveling through the ports where it meets the combustion chamber wall intersects the combustion chamber wall in a substantially-tangential fashion, and the helical port is so called because the centerline of main approach of air traveling through it where it meets the combustion chamber wall comprises a helical path just prior to entry into the cylinder. In general terms, this configuration produces a relatively high degree of swirl in the cylinder, at the expense of a reduced overall airflow capacity in a combustion engine.

Figure 3:
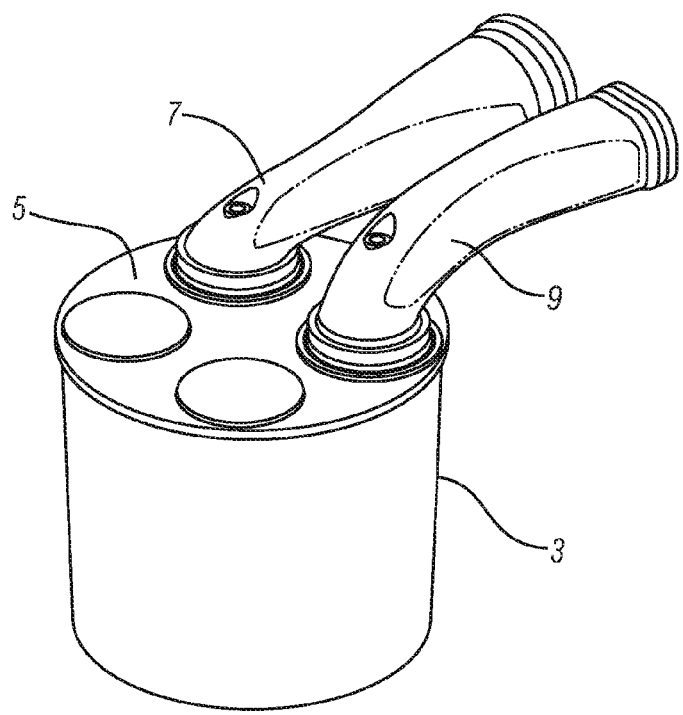
FIG. 3 is a perspective view of a related art cylinder having two intake ports, in accordance with the present disclosure.

FIG. 3 shows an alternate two intake-valve per cylinder configuration, including a tangential port 7, and a direct port 11. The direct port is so called, because the centerline of the main approach of air traveling through it where it meets the combustion chamber wall intersects the combustion chamber wall in a substantially-direct fashion, substantially parallel to the motion of the piston in the cylinder. In general terms, this configuration produces a relatively low degree of swirl, but has higher overall flow capacity in a combustion engine as compared to the configuration of FIG. 2.

Figure 4:
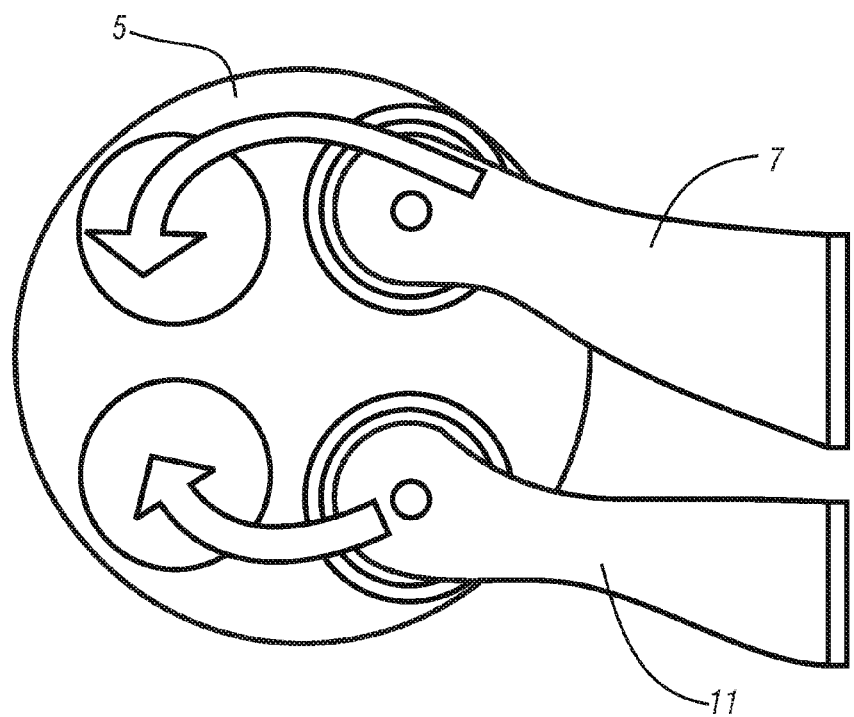
FIG. 4 is an overhead view of the general direction of related art swirl flow of air into a cylinder during an intake stroke of a combustion engine, in accordance with the present disclosure.

The general flow characteristics of air inside the cylinder shown in FIG. 3 during an intake stroke is represented in FIG. 4, wherein the air admitted to the cylinder through relatively low-flowing primary tangential port 7 swirls in a counter-clockwise direction as viewed from above, and the air admitted to the cylinder through relatively high-flowing secondary direct port 11 swirls in a clockwise direction as viewed from above. These counter-flowing currents each carry an angular momentum component, which to a large extent cancel one another, resulting in a lessened degree of overall air swirl inside the cylinder, but nevertheless a net amount of swirl in a predominant direction.

Figure 5:
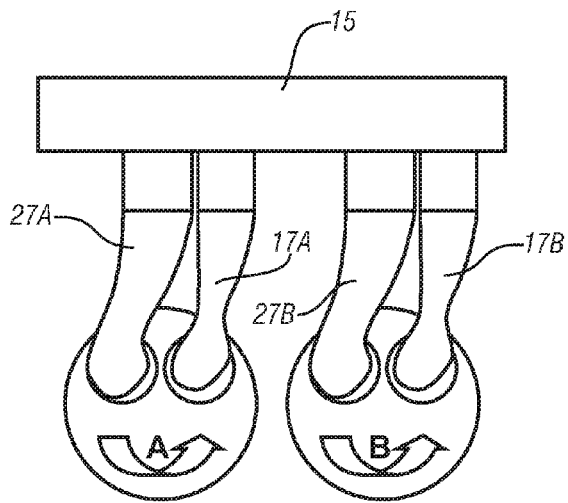
FIG. 5 qualitatively depicts the net predominant swirl direction in a related art cylinder of a combustion engine during an intake stroke, in accordance with the present disclosure.

Such a net amount of swirl in a predominant direction present in cylinders of a combustion engine is depicted pictorially in FIG. 5, which is an overhead view of two of the adjacent cylinders A and B of FIG. 1. In this arrangement, the configuration of the induction system of cylinder A, including the dispositions of primary intake port 27A and secondary intake port 17A, are identical to those of cylinder B. For each of cylinders A and B, the predominant swirl produced in the air mass present in the cylinders during an intake stroke is in the direction indicated by the arrows.

Figure 6:
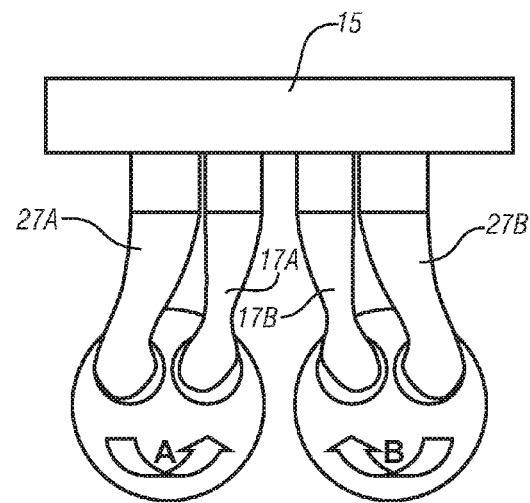
FIG. 6 is an overhead view of an arrangement according to one embodiment of the disclosure in which the primary intake port and secondary intake port of a first cylinder are provided to be a mirror-image of those present and associated with an adjacent second cylinder on a combustion engine, in accordance with the present disclosure.

According to one embodiment of the disclosure, an arrangement shown in FIG. 6 includes the primary intake port 27B and secondary intake port 17B of cylinder B designed to be a mirror-image of those present and associated with cylinder A, as shown. In such an embodiment, the net swirl for each of cylinders A and B is in opposite directions when viewed from above, as indicated by the arrows. This arrangement has no detrimental effects in diesel and other engine applications wherein the piston bowls are axi-symmetrical and the fuel injectors are substantially-centrally disposed about the cylinder. Such an arrangement of FIG. 6 as provided herein permits new possibilities of runner and port layouts that yield more advantageous swirl and flow parameters than provided by prior art runner and port configurations.

Figure 7:
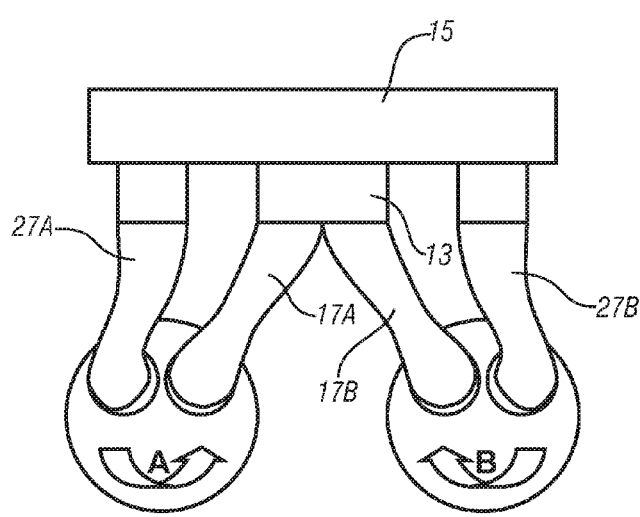
FIG. 7 is an overhead view of an arrangement according to one embodiment of the disclosure in which both of the secondary ports associated with adjacent engine cylinders of a pair are fed from a common runner, in accordance with the present disclosure.

In another embodiment according to the disclosure shown schematically in FIG. 7, both of the secondary ports 17A, 17B on adjacent engine cylinders A and B are fed from a common runner 13, and the angle of approach of incoming air passing through ports 17A, 17B to the cylinders (i.e., the predominant direction of airflow) can be designed to be altered or rotated relative to the angle of approach incoming air passing through ports 27A, 27B, when viewed from above, to a wide range of desired levels.

Figure 8:
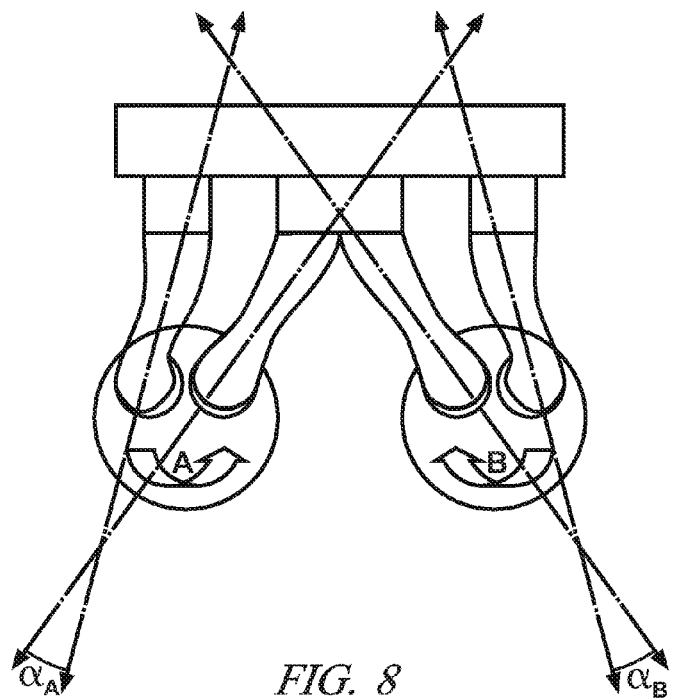
FIG. 8 is an overhead view of an arrangement according to one embodiment of the disclosure, showing the relative differences in the predominant paths of travel of air through intake ports present on a combustion engine, in accordance with the present disclosure.

Selective alteration of the angle of approach of air passing through secondary ports 17A, 17B relative to that passing through the primary ports 27A, 27B in the design stage via the architecture provided herein enables the overall swirl present in the cylinder and flow through the ports to be variably increased over known configurations. The angles labeled alpha and associated with cylinders A and B respectively ($\alpha_A$, $\alpha_B$) in FIG. 8 represent the angle between the predominant direction of airflow though primary ports 27A, 27B and secondary ports 17A, 17B, respectively as viewed from above the cylinder, indicated by the arrowed lines. In one embodiment, the angle alpha for any cylinder considered according to the disclosure can be any angle between about 10 degrees and about 45 degrees, including all angles and ranges of angles therebetween. In another embodiment, the angle alpha for any cylinder considered according to the disclosure can be any angle between about 15 degrees and about 35 degrees, including all angles and ranges of angles therebetween. In a preferred embodiment, the angle alpha for any cylinder considered according to the disclosure is greater than about 20 degrees. In a preferred embodiment, the angle alpha for any cylinder considered according to the disclosure is about 20 degrees. In some embodiments, the angles $\alpha_A$, $\alpha_B$ are the same on both adjacent cylinders of a pair present which are mirror images of one another. In some embodiments, the angles $\alpha_A$, $\alpha_B$ are substantially the same on both adjacent cylinders of a pair present which are mirror images of one another. In preferred embodiments, the angles $\alpha_A$, $\alpha_B$ are the same for all cylinders present on an engine provided using this disclosure. In preferred embodiments, the angles $\alpha_A$, $\alpha_B$ are substantially the same for all cylinders present on an engine provided using this disclosure. In alternate embodiments, the angles $\alpha_A$, $\alpha_B$ differ from one another for adjacent cylinders of a pair present which are mirror images of one another by no more than about 10 degrees. In further alternate embodiments, the angles $\alpha_A$, $\alpha_B$ differ from one another for adjacent cylinders of a pair present which are mirror images of one another by no more than about 5 degrees.

Figures 9A, 9B, 9C:
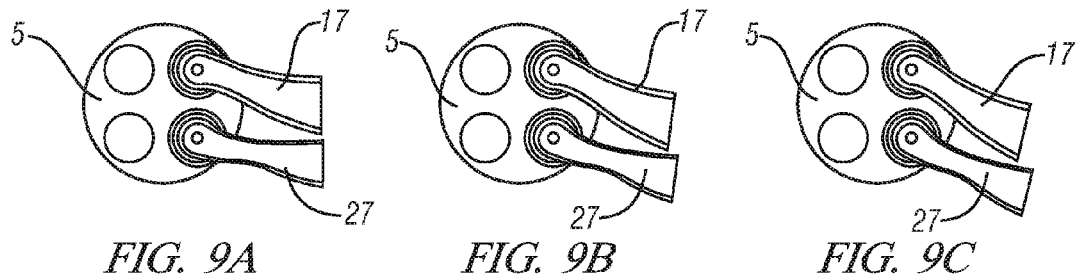
FIG. 9A is an overhead view of two intake ports terminating at a combustion chamber used as a baseline configuration in a computer flow simulation, in accordance with the present disclosure.
FIG. 9B is an overhead view of two intake ports terminating at a combustion chamber used in a computer flow simulation in which both intake ports have been rotated in a clockwise direction a first amount relative to the baseline configuration, in accordance with the present disclosure.
FIG. 9C is an overhead view of two intake ports terminating at a combustion chamber used in a computer flow simulation in which both intake ports have been rotated in a clockwise direction a second amount relative to the baseline configuration, in accordance with the present disclosure.

FIGS. 9A, 9B, and 9C show overhead perspective views of three different orientations of the ports for a same given cylinder, provided with intake ports described herein. FIG. 9A represents a baseline situation of relative intake port orientation, FIG. 9B shows a configuration wherein both ports are rotated 7.5 degrees clockwise from the baseline position, and FIG. 9C shows a configuration wherein both ports are rotated 15 degrees clockwise from the baseline position. Computer modeling was used to validate the ability of an architecture as provided herein to achieve a relatively higher level of in-cylinder swirl without sacrifices in flow capacity.

Figure 10A:
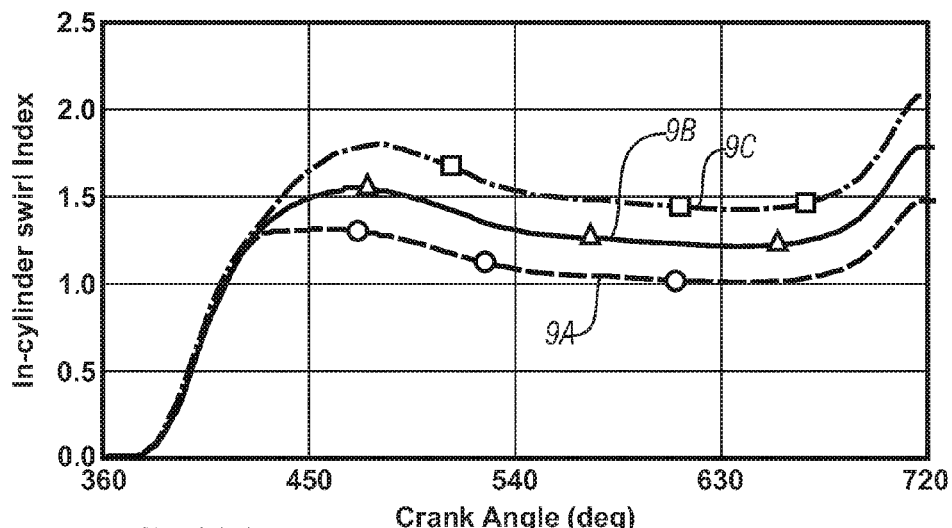
FIG. 10A is a graphical representation of the relative amounts of in-cylinder air swirl provided by a computer simulation using the configurations depicted in FIGS. 9A, 9B, and 9C, in accordance with the present disclosure.

Thus, FIG. 10A illustrates the relative increase in swirl index present in the cylinder for the three different scenarios shown pictorially in FIGS. 9A, 9B, and 9C. The baseline configuration of FIG. 9A provides a swirl index of about 1 over the range of crank angles from about 540-675 degrees. The configuration shown in FIG. 9B wherein both ports are rotated clockwise 7.5 degrees clockwise relative to the baseline configuration provides a swirl index of about 1.3 over the range of crank angles from about 540-675 degrees. The configuration shown in FIG. 9C wherein both ports are rotated clockwise 15 degrees clockwise relative to the baseline configuration provides a swirl index of about 1.5 over the range of crank angles from about 540-675 degrees. While these results may have some variability among engines having different operating parameters, it is understood that we have established the presence of a significant effect, and have found that rotation of primary port 17 does not substantially impact its swirl generation capability.

Figure 10B:
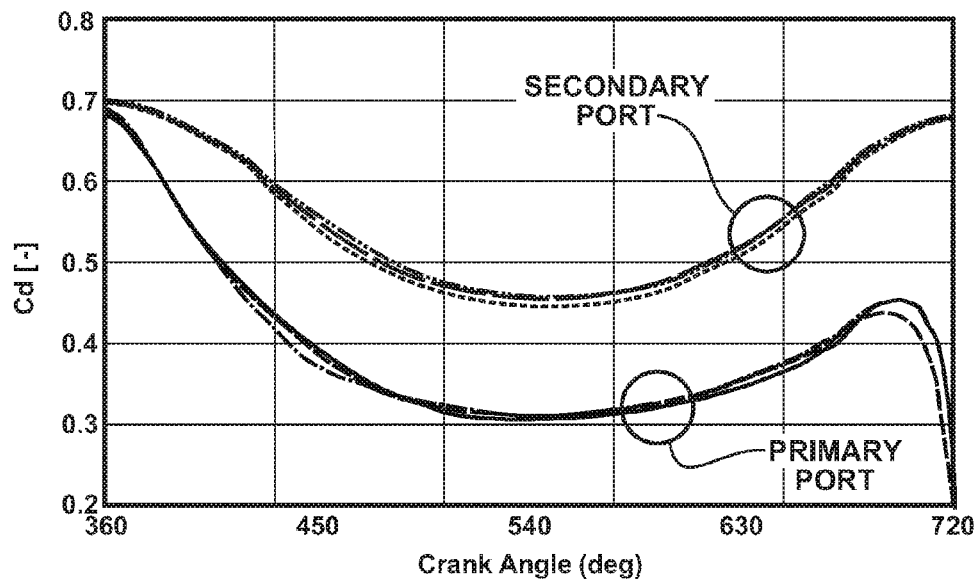
FIG. 10B is a graphical representation of the relative amounts of air flow through primary and secondary intake ports, provided by a computer simulation using the configurations depicted in FIGS. 9A, 9B, and 9C, in accordance with the present disclosure.

This effect is further supported by the lack of any loss of flow capabilities in the simulation, shown in FIG. 10B, which shows generally the flow capacity (Cd[–]) versus crank angle for each of the intake valves present for each of the configurations shown in FIGS. 9A, 9B, 9C. From FIG. 10B it is readily seen that the flow for each of the valves in the primary and secondary ports are unaffected by rotation of the angle of approach of the ports as described. Taken as a whole, the architecture provided herein affords increased in-cylinder swirl, without loss of flow capability.

Figure 11:
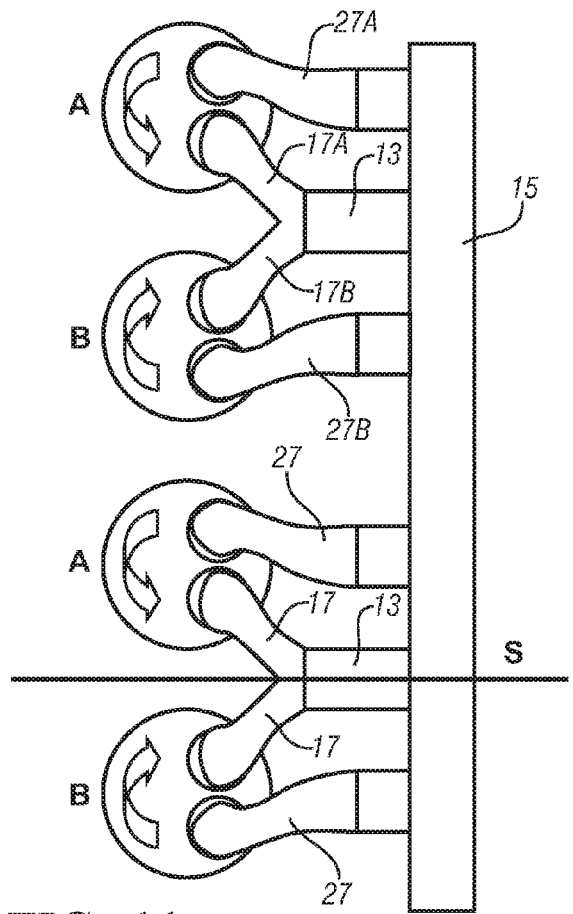
FIG. 11 shows an overhead schematic view of the relative dispositions of intake ports and cylinders present on an in-line four-cylinder, four-cycle combustion engine, in accordance with the present disclosure.

FIG. 11 shows an overhead schematic view of the relative dispositions of intake ports and cylinders present on an in-line four-cylinder, four-cycle combustion engine according to one preferred form of the disclosure. An engine provided with the architecture shown in FIG. 11 includes two cylinder pairs, with each pair of cylinders comprising a cylinder A and a cylinder B, adjacent to one another. Intake ports, including primary ports 27 and secondary ports 17, are shown disposed between intake valves present on each of the cylinders and an intake manifold 15. Exhaust ports and their associated runners are omitted, for clarity in the illustration. In this embodiment, the secondary intake ports 17 for each of the adjacent cylinders of a given pair have their inner passageway commonly connected to and fed from a single runner 13. Such an arrangement allows the intersection angle alpha, as defined in FIG. 8, to be increased, leading to elevated swirl level as depicted in FIG. 10. Also shown in the overhead view of FIG. 11 is plane of symmetry S, about which plane the intake ports of cylinders present in an adjacent pair as provide herein are seen to be substantial mirror images of one another. Although applicable to FIG. 11 in which two of the ports are fed by a common runner, such symmetry is also present in other embodiments, including without limitation those embodied in FIG. 6. In some embodiments, the plane of symmetry S is disposed to be substantially perpendicular to the direction of engine crankshaft rotation. In other embodiments, the plane of symmetry S is disposed to be substantially parallel to the direction of engine crankshaft rotation. In further embodiments, the plane of symmetry S is disposed to be neither substantially parallel nor substantially perpendicular to the direction of engine crankshaft rotation.

Intake port runners and combustion chambers herein described may be provided using conventional casting techniques during the cylinder head manufacturing process, employing conventional cylinder head materials, which include without limitation iron and aluminum, and alloys thereof. Although it is preferred to provide architectures as set forth herein as part of a cylinder head for use as a component in constructing a combustion engine, other equivalent methods for achieving substantially the same result on a finished engine that are known in the art may be employed, including casting intake passages or a portion thereof into a cylinder block, as in the case of non-overhead valved engines. This includes all embodiments employing any geometry in which all primary ports on one cylinder head according to the disclosure and/or bank of cylinders on an engine provided hereby are fed by the same intake manifold as are the secondary ports, as well as all embodiments employing any geometry in which all primary ports on one cylinder head according to the disclosure and/or bank of cylinders on an engine provided hereby are fed by a separate intake manifold as are the secondary ports. Architectures provided herein are useful for deployment on compression-ignition and direct-injection engines having reciprocating piston assemblies, including four-cylinder diesel engine configurations. However, a structure provided herein are indicated as finding use in other employments recognizable by those skilled in the art.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An internal combustion engine including a pair of adjacent cylinders, each one of said pair of adjacent cylinders comprising:
   a piston;
   a first intake valve;
   a second intake valve;
   a primary port associated with said first intake valve; and
   a secondary port associated with said second intake valve;
   each of said ports being configured to provide a predominant direction of airflow therethrough during engine operation when viewed from above said cylinders, said ports being effectively oriented to provide respective in-cylinder air-swirl of opposite direction in each one of said pair of adjacent cylinders during an intake stroke of a respective piston; wherein the respective ports associated with each one of said pair of adjacent cylinders are configured so that an angle of intersection between the predominant direction of airflow through the respective primary port and the predominant direction of airflow through the respective secondary port is any angle in the range of between 10 degrees and 45 degrees, including all angles and ranges of angles therebetween, when viewed from above said cylinder.

2. An internal combustion engine according to claim 1 wherein the ports associated with the pair of adjacent cylinders are substantial mirror images of one another about a plane of symmetry when viewed from above said cylinders.

3. An internal combustion engine according to claim 1 comprising at least two pairs of adjacent cylinders as claimed in claim 1.

4. Method according to claim 1 wherein said angle is greater than 20 degrees.

5. An internal combustion engine according to claim 1 wherein said angle of intersection is selected to be an effective angle for providing a higher level of swirl within the respective single cylinder with no substantial reduction in flow capacity through said ports relative to lesser angles of intersection.

6. An internal combustion engine according to claim 1 wherein the secondary port comprises either a direct port or a tangential port.

7. An internal combustion engine according to claim 1 wherein said primary port comprises either a direct port or a tangential port.

8. An internal combustion engine according to claim 7 wherein said primary port comprises a tangential port and said secondary port comprises a direct port.

9. An internal combustion engine according to claim 1 wherein the primary port of each one of said pair of adjacent cylinders is fed air from a single common runner.

10. An internal combustion engine according to claim 9 wherein said single common runner is disposed between the respective secondary port of each one of said pair of adjacent cylinders.

11. An internal combustion engine including a pair of adjacent cylinders, each one of said pair of adjacent cylinders comprising:
a piston;
a first intake valve;
a second intake valve;
a primary port associated with said first intake valve; and
a secondary port associated with said second intake valve;
each of said ports being configured to provide a predominant direction of airflow therethrough during engine operation when viewed from above said cylinders, said ports being oriented to provide respective in-cylinder air-swirl of opposite direction in each one of said pair of adjacent cylinders during an intake stroke of a respective piston; wherein the respective ports associated with each one of said pair of adjacent cylinders are configured so that an angle of intersection between the predominant direction of airflow through the respective primary port and the predominant direction of airflow through the respective secondary port is any angle in the range of between 15 degrees and 35 degrees, including all angles and ranges of angles therebetween, when viewed from above said cylinder.

12. Method according to claim 11 wherein said angle is 20 degrees.

13. Method for causing an increase in swirl during a respective air-intake stroke in each one of a pair of adjacent cylinders present on an internal combustion engine, each one of the pair of adjacent cylinders having two intake ports and corresponding intake port runners, the method comprising:
configuring one of said respective intake ports of each one of the pair of adjacent cylinders as a direct port;
configuring the other of said respective intake ports of each one of the pair of adjacent cylinders as a tangential port;
arranging all of said respective intake ports so that the direction of swirl in one of the pair of adjacent cylinders is opposite to the direction of swirl in the other of the pair of adjacent cylinders; wherein arranging all of said respective intake ports comprises configuring the respective runners in each one of the pair of adjacent cylinders so that the predominant direction of airflow through one of the respective intake ports of a respective one of the pair of adjacent cylinders intersects the predominant direction of airflow through the other of the respective intake ports of the respective one of the pair of adjacent cylinders at any angle between 10 degrees and 45 degrees, including all angles and ranges of angles therebetween.

14. Method according to claim 13 wherein arranging all of said respective intake ports further comprises configuring the respective runners in each one of the pair of adjacent cylinders so that the predominant direction of airflow through one of the respective intake ports of a respective one of the pair of adjacent cylinders intersects the predominant direction of airflow through the other of the respective intake ports of the respective one of the pair of adjacent cylinders at any angle between 15 degrees and 35 degrees, including all angles and ranges of angles therebetween.

15. Method according to claim 14 wherein said angle is 20 degrees.

16. Method according to claim 13 wherein said angle is greater than 20 degrees.

17. Method according to claim 13 wherein arranging all of said respective intake ports comprises integrating the respective intake port runners corresponding to the respective direct port of each one of the pair of adjacent cylinders into a single common runner.

* * * * *